United States Patent [19]

Byers et al.

[11] Patent Number: 5,519,876
[45] Date of Patent: May 21, 1996

[54] PROCESSOR COMMUNICATIONS BUS HAVING ADDRESS LINES SELECTING DIFFERENT STORAGE LOCATIONS BASED ON SELECTED CONTROL LINES

[75] Inventors: Larry L. Byers, Apple Valley; Joseba M. De Subijana, Minneapolis; Wayne A. Michaelson, Circle Pines, all of Minn.

[73] Assignee: UNISYS Corporation, Blue Bell, Pa.

[21] Appl. No.: 172,629

[22] Filed: Dec. 23, 1993

[51] Int. Cl.$^6$ .................................................... G06F 12/00
[52] U.S. Cl. ....................... 395/800; 395/401; 395/402; 364/DIG. 1
[58] Field of Search ............................... 395/800, 425, 395/200, 401, 402; 364/DIG. 1

[56] References Cited

U.S. PATENT DOCUMENTS

| | | | |
|---|---|---|---|
| 4,644,469 | 2/1987 | Sumi | 364/200 |
| 4,774,652 | 9/1988 | Dhuey et al. | 395/400 |
| 4,807,196 | 2/1989 | Mizukami | 365/189.08 |
| 4,855,581 | 8/1989 | Mertel et al. | 235/462 |
| 4,947,366 | 8/1990 | Johnson | 364/900 |
| 5,012,468 | 4/1991 | Siegel et al. | 370/85.5 |
| 5,067,071 | 11/1991 | Schanin et al. | 395/293 |
| 5,109,490 | 4/1992 | Arimilli | 395/325 |
| 5,210,834 | 5/1993 | Zurawski et al. | 395/375 |
| 5,237,567 | 8/1993 | Nay et al. | 370/85.1 |
| 5,245,705 | 9/1993 | Swaney | 395/200 |
| 5,287,460 | 2/1994 | Olsen et al. | 395/275 |
| 5,384,789 | 1/1995 | Tomita | 371/40.1 |

*Primary Examiner*—Alyssa H. Bowler
*Assistant Examiner*—Dzung C. Nguyen
*Attorney, Agent, or Firm*—Steven P. Skabrat; Charles A. Johnson; Mark T. Starr

[57] ABSTRACT

A bus architecture includes address lines, data lines, and control signals to allow a processor to communicate with a VLSI gate array. The address lines are interpreted by the VLSI gate array to select either multi-bit registers or single bit designators resident on the VLSI gate array depending on which control signal is received from the processor. Dual address decode logic on the VLSI gate array senses control signals indicating a request to read from a register, write to a register, and set, clear, or test a designator, and decodes the address received to select the appropriate storage location for the requested function.

3 Claims, 7 Drawing Sheets

PROCESSOR COMMUNICATIONS BUS HAVING ADDRESS LINES SELECTING DIFFERENT STORAGE LOCATIONS BASED ON SELECTED CONTROL LINES

CROSS REFERENCES TO RELATED APPLICATIONS

This application is related to the concurrently filed applications listed below, the disclosures of which are incorporated herein by reference. All of the listed applications are assigned to the same assignee as the present invention.

Microsequencer Bus Controller System, Ser. No. 08/172,657, invented by Larry L. Byers, Joseba M. De Subijana, and Wayne A. Michaelson.

BACKGROUND OF THE INVENTION

1. Field of the Invention

This invention relates generally to multi-processor computer systems. More specifically, it relates to the use of address and control lines of a bus connecting multiple processors and special purpose Very Large Scale Integration (VLSI) gate arrays.

2. Background Information

Many computer systems today are composed of multiple processing units in order to increase their processing power. These programmable processors often must interact with hardwired logic such as VLSI gate arrays. Some functions of complex computer systems are performed by such hardware because of the increased speed capabilities this hardware provides. However, other functions may be better implemented in software or firmware because of the flexibility software or firmware provides. In a large computer system such as the Extended Processing Complex (XPC), a file cache system designed to operate in conjunction with a 2200 Series computer system, both of which are available from Unisys Corporation, some capabilities of embedded subsystems are implemented in a combination of hardware and software/firmware. These subsystems performed required functions as components of the larger system. These subsystems combine the increased speed of hardware implementations with the flexible nature of programming to efficiently satisfy subsystem requirements.

The processors and VLSI gate arrays present in these subsystems communicate with each other over a bus. A bus is an electronic pathway in a digital computer that provides a communication path for transferring data signal and other signals between a processor and a peripheral device. A bus contains one signal line for each bit needed to specify the address of a device or location in memory, plus additional signal lines that distinguish among the various data transfer operations to be performed. A bus can transmit data in either direction between any two components connected to it. Without a bus, separate lines would be needed for all possible connections between the components. The use of a bus avoids this complexity.

However, the use of a bus has its limitations. The number of storage locations resident on a device connected to the bus that are directly addressable by a processor on the bus is limited to $2^{**}N$, where N is the number of lines available for carrying address information. In many of today's complicated VLSI gate array designs, such as those used in the XPC, the number of pins available for address lines is limited, but the size of memory desired to be directly accessed is growing. Thus, if a processor needs to access more storage locations than are possible because of pin out concerns, there is a problem. A mechanism is needed to enlarge the address space of the bus without adding more address lines.

One approach to this problem is to use based addressing rather than direct addressing. In based addressing, the processor writes data specifying a base address into a base register on the VLSI gate array. Subsequent memory references to that VLSI gate array are interpreted as being relative to the base address. This method increases the number of storage locations that are accessible by the processor without increasing the number of address lines. However, there is an increased cost in bus transfers because of the need to load the base register frequently. To reference a given storage location, two bus accesses are necessary— one to load the base register and another to specify the offset address. The use of this method in some situations incurs a substantial performance penalty. A more efficient method is needed.

In addition, increased performance in accessing single bit flags called designators located on the gate arrays is needed. A typical method of performing a set or clear operation on a designator includes reading the status location of the designator from the gate array to the processor, updating the status, and writing the status from the processor back into the designator on the gate array. The typical method requires two bus accesses. Similarly, the typical method of performing a test operation on a designator includes reading the status of the designator, shifting and masking the data to isolate the designator status, and testing the flag. Clearly, performance would be improved if the set, clear, and test functions could be accomplished in one bus access.

SUMMARY OF THE INVENTION

An object of this invention is to increase the number of directly accessible storage locations resident on a device external to a processor by communicating an address which may be interpreted in multiple ways, and a control signal signifying a function to be performed, on a bus connecting the device and the processor.

Another object of this invention is control the access by a processor to registers and designators resident on a device coupled to the processor by a bi-directional bus, so that the total number of registers and designators direct accessible is greater than is normally possible for the number of address lines available on the bus.

Still another object of this invention is allow a processor to efficiently read and write registers, and set, clear and test designators, the registers and designators being resident on a VLSI gate array connected to the processor by a bi-directional bus, such that the number of lines of the bus used to directly address the registers and designators is minimized.

Yet another object of this invention is allow a processor to set, clear and test designators resident on a VLSI gate array connected to the processor by a bi-directional bus by only one bus access operation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by a bus architecture that provides a larger address space for a given number of address lines by using control signals as function requests, these function requests requiring different interpretations of the address lines by the receiving device.

In accordance with an aspect of this invention, the system comprises a processor that sends address lines and a control signal to request the performance of a function by a device coupled to the processor by a bus. This device includes multiple storage locations called registers and designators. Registers contain multiple bits whereas designators are single bit flags. The device receives the address lines and a control signal and performs the requested function specified by the control signal. The address lines are interpreted by the device to select either registers or designators, depending on which control signal was received.

In accordance with another aspect of the invention, a method for accessing registers and designators resident on a gate array by a processor connected to the gate array by a bi-directional bus, the bus including control signals to read and write registers, and set, clear, and test designators, data lines, and address lines is disclosed. The processor activates the address lines to reference a selected register or designator on the gate array. The processor activates a control signal to direct the gate array to perform a function on the storage location specified by the address lines. The gate array senses the control signal and decodes the address lines to select a register or a designator depending on which control signal was sensed. If the sensed control signal indicates a read of a register is requested, the gate array reads the selected register and returns the selected register's contents to the processor over the data lines. If the sensed control signal indicates a write of a register is requested, the gate array writes the selected register with data received from the processor over the data lines. If the sensed control signal indicates the setting of a designator is requested, the gate array sets the selected designator. If the sensed control signal indicates the clearing of a designator is requested, the gate array clears the selected designator. Finally, if the sensed control signal indicates a test of a designator is requested, the gate array tests the state of the selected designator and returns it to the processor over a separate control signal.

The method and apparatus of the invention thus provides a processor with the capability to access more storage locations on a gate array without using more address lines.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

I. The Microsequencer Bus Controller System

The Microsequencer Bus Controller System provides the capability of flexible, microprocessor-based control of multiple gate arrays on a circuit card within a larger computer system. It is a flexible solution to the problem of controlling function-specific VLSI gate arrays on one circuit card because one or more gate arrays can be changed without any other changes in the Microsequencer Bus Controller System hardware. When a gate array is changed, a corresponding change to the program the microprocessors execute may easily be made.

Figure 1:
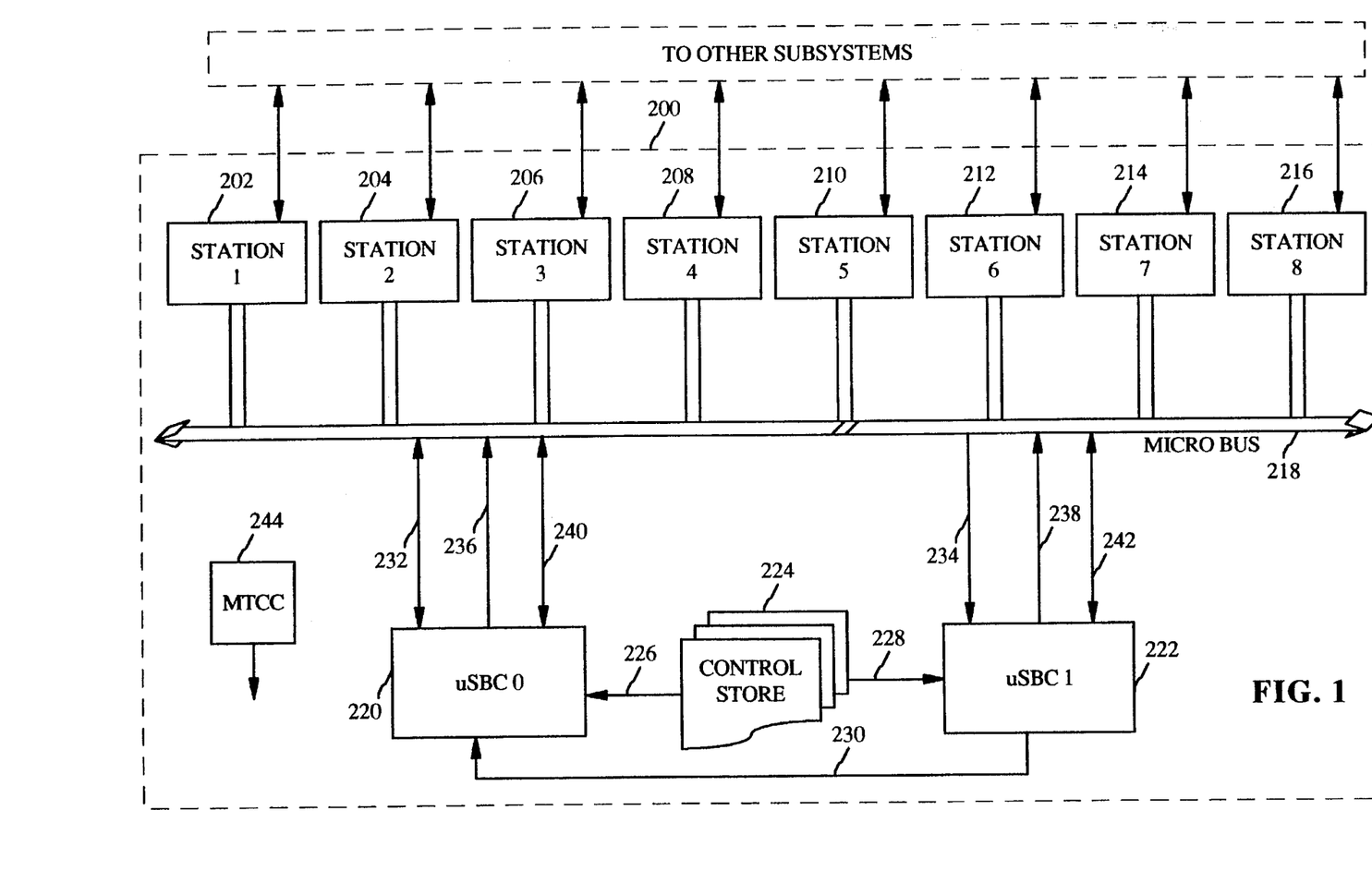
FIG. 1 is a block diagram of the Microsequencer Bus Controller System.

FIG. 1 is a block diagram of the Microsequencer Bus Controller System. The Microsequencer Bus Controller System 200 contains up to eight Stations 202, 204, 206, 208, 210, 212, 214, 216 connected to a bi-directional internal communication bus called the Micro Bus 218. A Station is a collection of logic implemented in a gate array on a VLSI part produced with Complementary Metal-Oxide Semiconductor (CMOS) 448 technology that performs specific functions. A Station is coupled to the Micro Bus 218 and also may interface with another bus, I/O mechanism, or subsystem that is external to the Microsequencer Bus Controller System. That is, it may read data from or write data to other hardware components. In the preferred embodiment, there are ten different gate array designs representing Stations in the system. However, it is possible that any custom designed gate array supporting a set of required functions can fulfill the role of a Station and be connected to the Micro Bus 218. A Station contains multiple memory locations that may be read from, written to, or tested. These memory locations are either registers or designators. A register is a memory location containing multiple bits. In the preferred embodiment, a register contains 32 bits. A designator is a single bit memory location and is often used as a flag which may be set, cleared, and tested.

The Micro Sequencer Bus Controller (uSBC) 0 220 and uSBC 1 222 are special purpose reduced instruction set (RISC) microprocessors that control the operation of the Stations via the Micro Bus 218. The uSBCs execute an instruction stream that is stored in the Control Store 224, a high speed static random access memory (SRAM). The instruction stream is written into the Control Store 224 at system initialization time. The instruction stream is fetched by uSBC 0 220 from the Control Store 224 over Line 226. The same instruction stream is fetched by uSBC 1 222 from the Control Store 224 over Line 228. The first microprocessor, uSBC 0 220, is the master, and the second microprocessor, uSBC 1 222, is the slave. The master and slave execute the same instructions at the same time but only the master microprocessor writes data on the Micro Bus 218. Results of operations performed by the slave microprocessor uSBC 1 222 are forwarded over Line 230 to the master microprocessor uSBC 0 220, where they are compared with the results of operations performed by the master microprocessor uSBC 0 to detect any possible errors. The uSBCs connect to the Micro Bus 218 over three distinct sets of lines: Address Lines 232, 234, Data Lines 236, 238, and Control Lines 240, 242.

The Micro Bus 218 is a bi-directional bus used by the uSBCs to communicate with the Stations and for data transfer between Stations. It provides access from a uSBC to hardware registers and designators resident on a Station. The Maintenance Clock Control (MTCC) gate array 244 provides maintenance operations such as fault detection, clock distribution and control, and system reset/recovery for all components of the Microsequencer Bus Controller System 200. The MTCC drives a bus enable line, which allows the uSBCs 220, 222, and the Stations to drive data on the Micro Bus 218.

II. The Micro Bus

The Micro Bus 218 is a bi-directional bus which provides communication paths between the uSBCs and the Stations. The Micro Bus consists of Data lines 232, Address lines 236, and various Control lines 240. The address portion of the bus is capable of addressing up to eight Stations. The Stations and the uSBCs transmit and receive data between themselves across the Micro Bus. The Micro Bus is adaptable to either a 36 bit data bus, or a 32 bit data bus. The mode of parity checking on the Micro Bus is different depending on whether the data bus is 36 bits or 32 bits.

A. Bi-directional Signals

Figure 2:
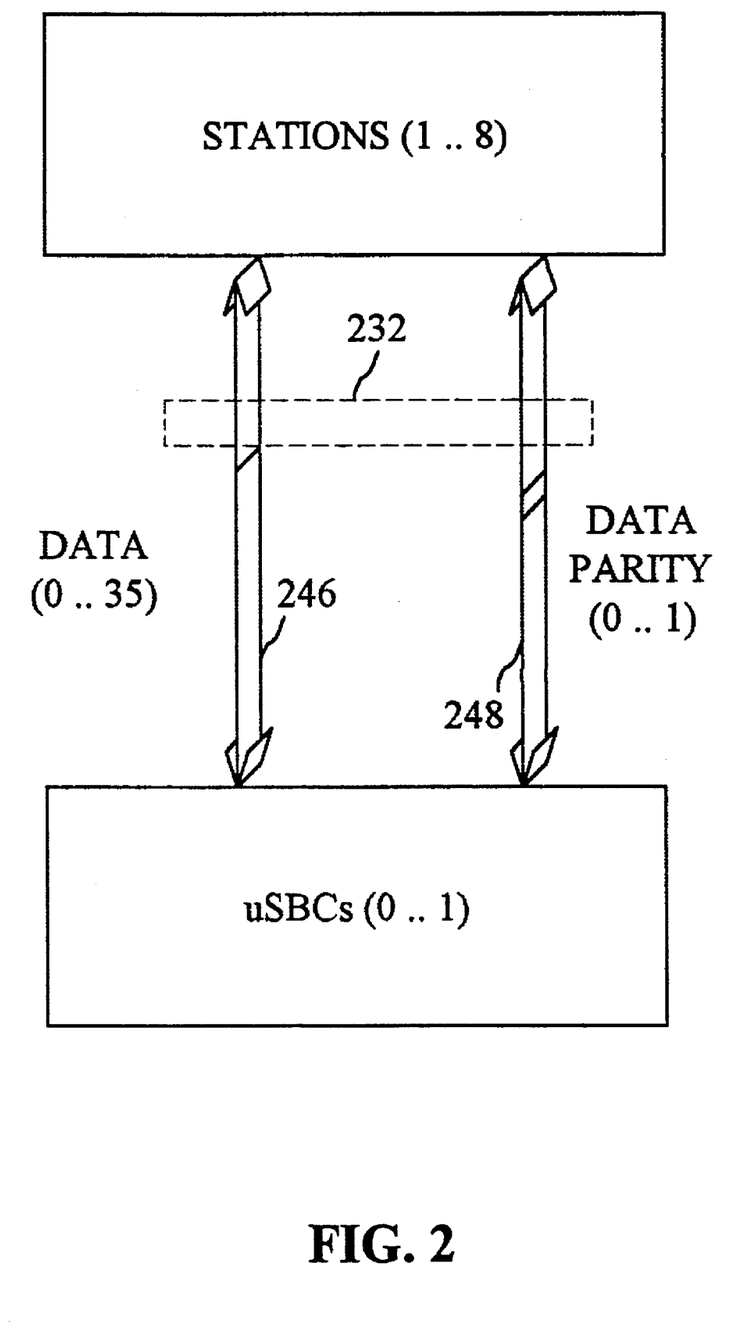
FIG. 2 is a block diagram illustrating the Dam and Data Parity paths of the Micro Bus.

FIG. 2 is a block diagram illustrating the Data and Data Parity paths of the Micro Bus. The Data path 246 between the uSBCs 220, 222, and the Stations 202, 204, 206, 208, 210, 212, 214, 216, consists of 36 bits. The Data Parity path 248 consists of two bits. Data and Data Parity can be sent from a uSBC to a Station, or from a Station to a uSBC.

B. Signals From A uSBC To A Station

1. Address and Address Parity Signals

Figure 3:
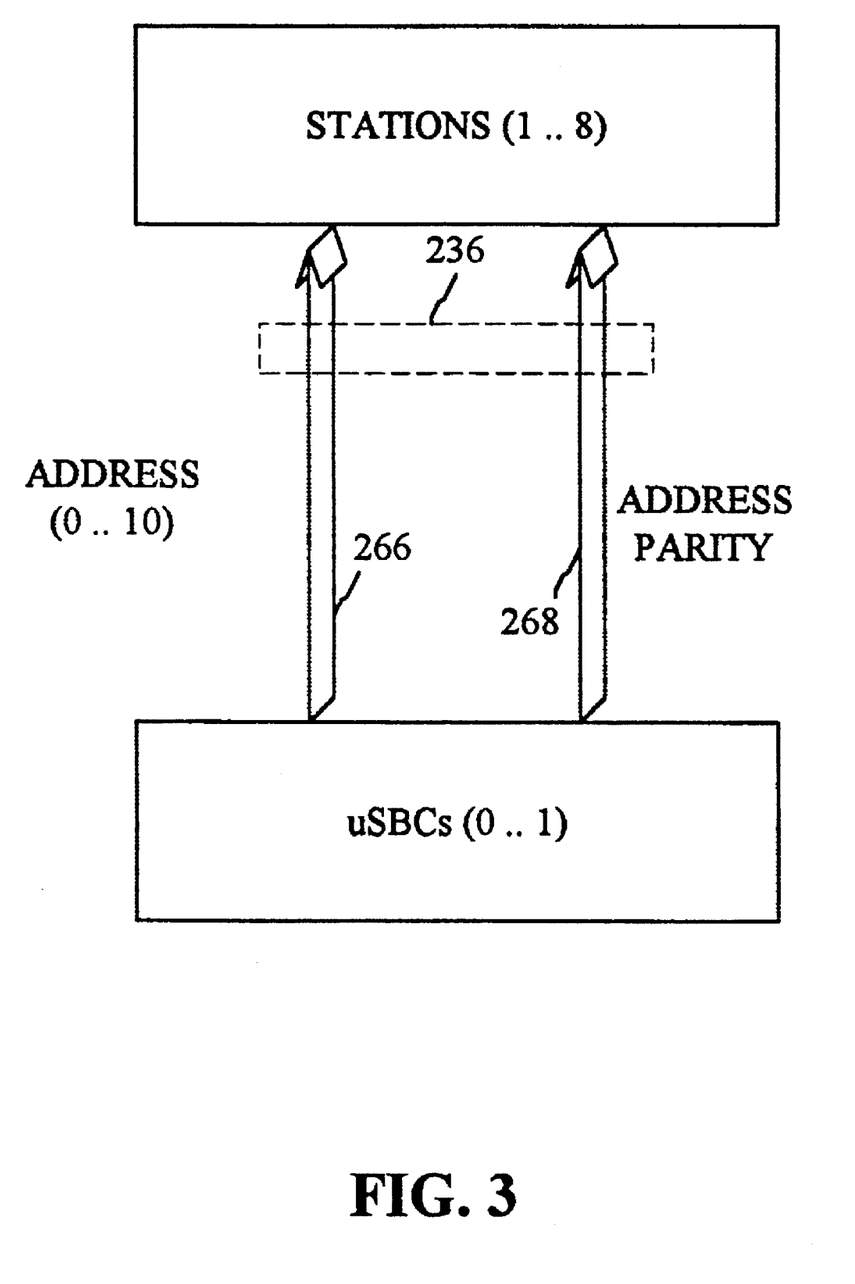
FIG. 3 is a block diagram illustrating the Address and Address Parity paths of the Micro Bus.

FIG. 3 is a block diagram illustrating the Address and Address Parity paths of the Micro Bus. Each uSBC can independently put 11 bits of Address 266 onto the Micro Bus 218 to select a Station and register from which to read data or write data. For bus driving reasons, each uSBC drives four Stations. USBC 0 220 drives the addresses for Stations 1, 2, 3, and 4, labelled 202, 204, 206, and 208, respectively, and uSBC 1 222 drives the addresses for stations 5, 6, 7, and 8, labelled 210, 212, 214, 216 respectively. An Address Parity bit 268 corresponding to each Address is also put onto the Micro Bus. This Address Parity bit represents the odd parity of the Address 266.

Figure 4:
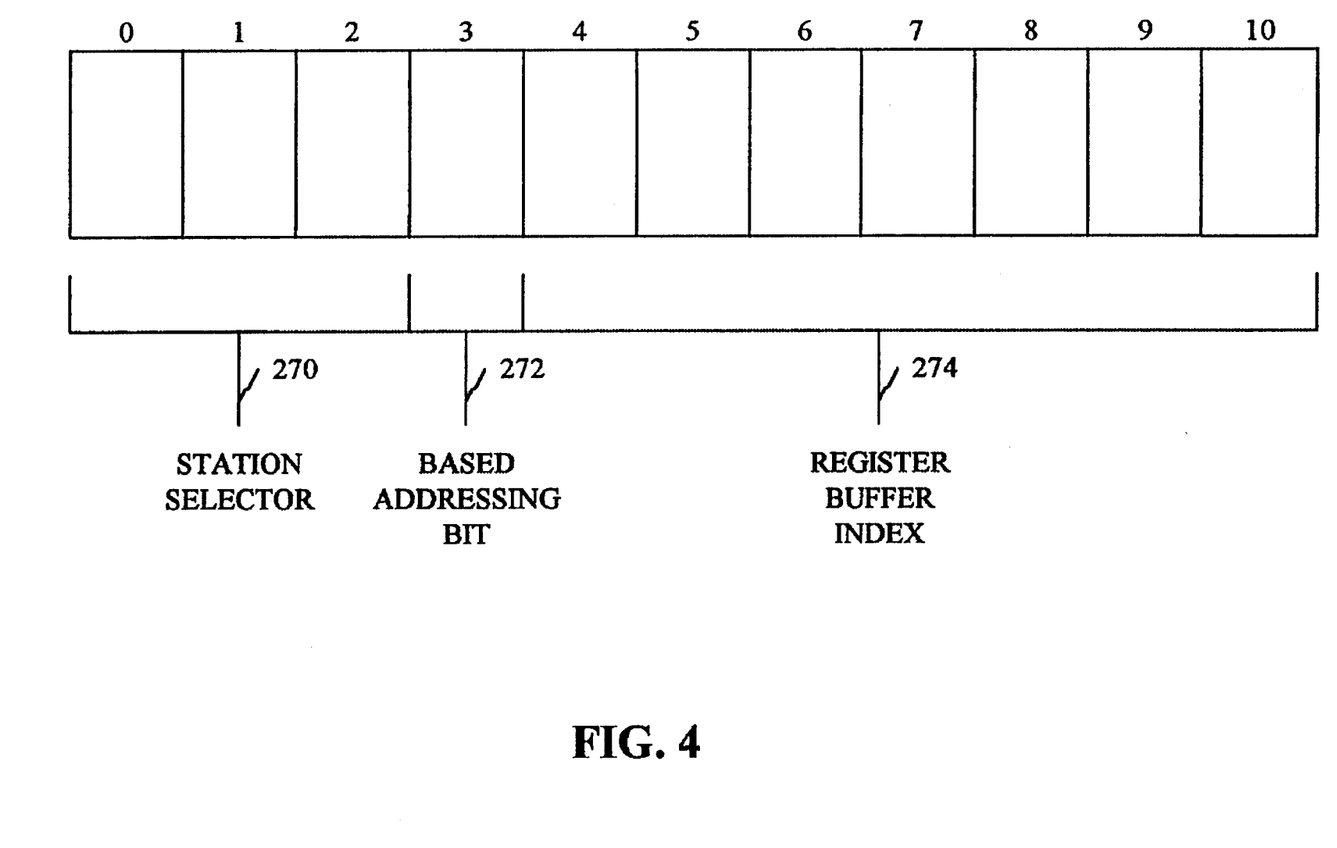
FIG. 4 shows the format of an Address for the Micro Bus.

FIG. 4 shows the format of an Address for the Micro Bus 218. The Station Selector field 270, stored in bits 0-2, is used to address one of the eight Stations. The Based Addressing Bit field 272, stored in bit 3, is used to select one of two possible modes of operation: Direct addressing, when clear, or Based addressing, when set. Direct addressing is used to address registers and designators on a Station that does not have a particular addressing structure. Direct addressing allows for addressing up to 128 registers and designators if the station is designed to accommodate both Direct and Based addressing modes. If the Station does not have Based addressing mode, then up to 256 registers and designators can be addressed. Based addressing may be used to reference multiple register stacks, and allows addressing of buffers up to 128 registers deep. The Register Buffer Index field 274, stored in bits 4–10, indicates which register or designator to reference within the selected Station.

2. Source Signals

Figure 5:
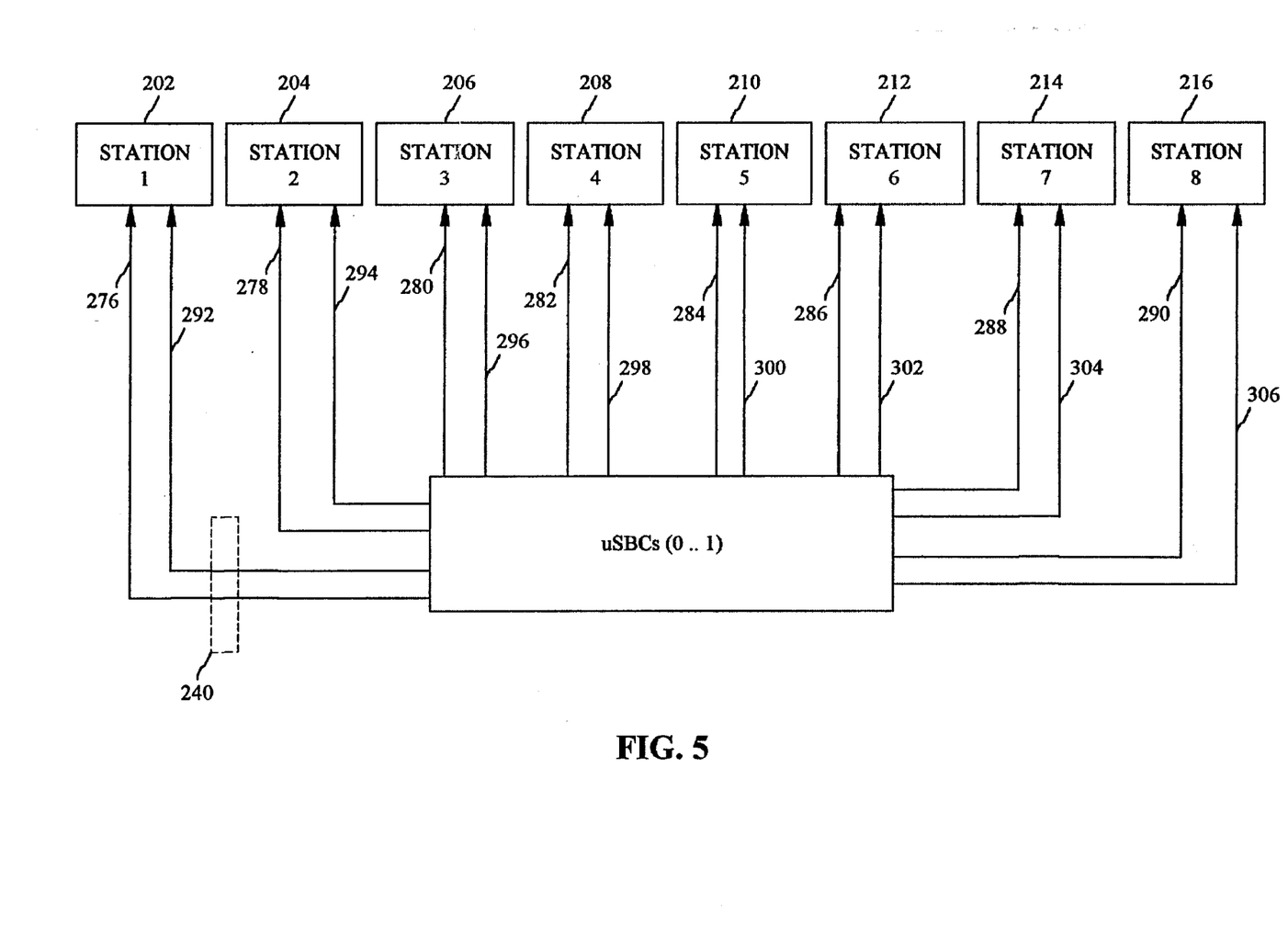
FIG. 5 is a block diagram illustrating the Source and Bus Busy signals of the Micro Bus.

FIG. 5 is a block diagram illustrating the Source and Bus Busy signals of the Micro Bus. There are eight Source (SRC) signals 276, 278, 280, 282, 284, 286, 288, and 290; one for each Station. A SRC signal is generated by a uSBC when it executes an instruction that fetches the instruction operand from a register or designator located on a Station. Thus, the SRC signal specifies a request to read data from a Station.

3. Bus Busy Signals

FIG. 5 shows the Source and Bus Busy signals of the Micro Bus. There are eight Bus Busy signals 292, 294, 296, 298, 300, 302, 304, and 306; one for each Station. Bus Busy signals are activated by a uSBC when it is executing a SRC instruction. All Stations receive a Bus Busy signal except the station that was addressed by the SRC instruction. This signal indicates to the Station that it cannot transmit data because the Micro Bus 218 is currently in use. In this way, the uSBCs ensure that Stations not being addressed by the SRC instruction do not accidentally (because of hardware malfunction) transmit data on the Micro Bus.

4. Data Destinate Signals

Figure 6:
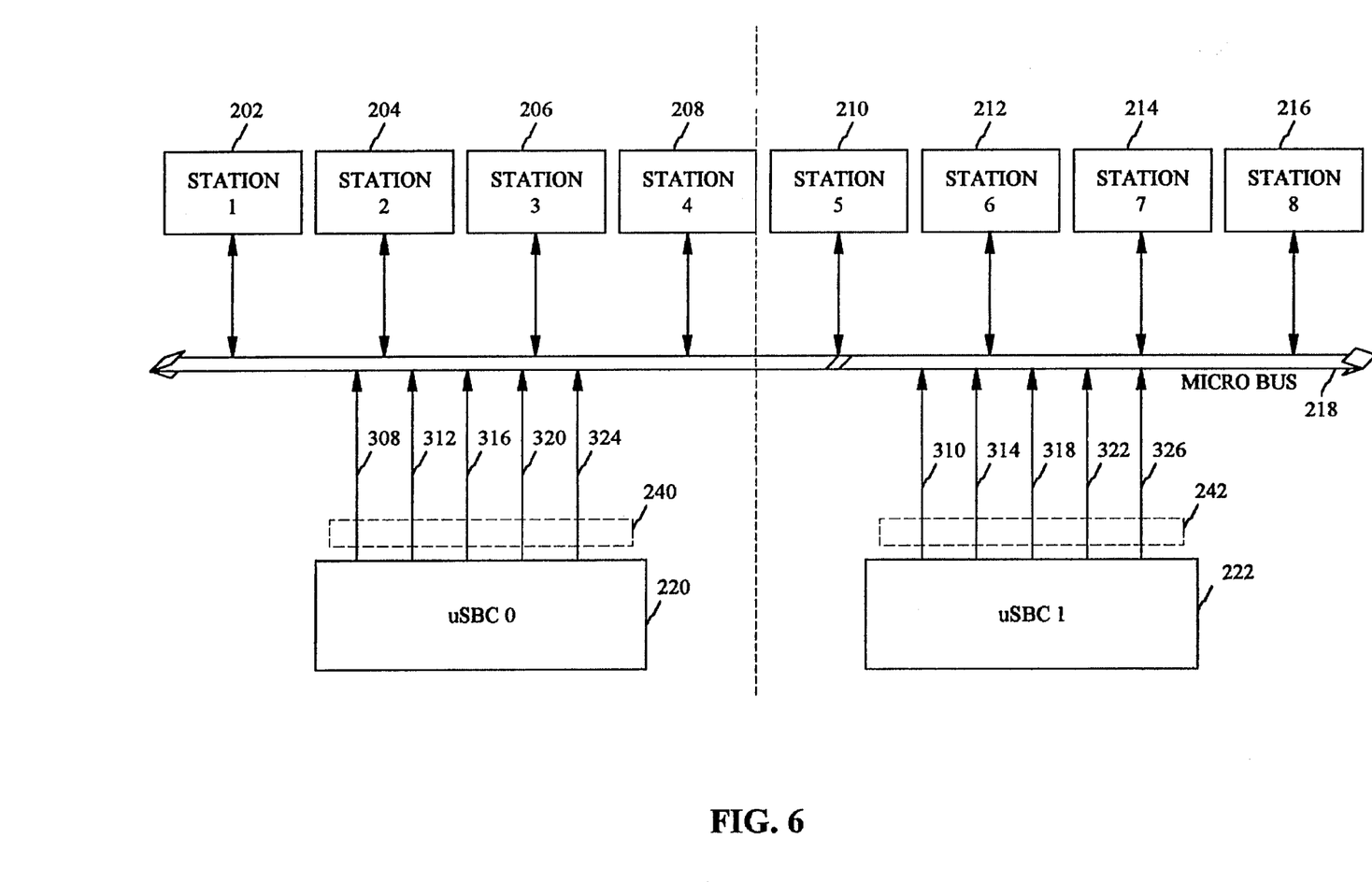
FIG. 6 is a block diagram illustrating five control signals that are output from the Microsequencer Bus Controllers to the Micro Bus.

FIG. 6 is a block diagram illustrating five control signals that are output from the Microsequencer Bus Controllers to the Micro Bus. There is one Data Destinate (DST) signal output from each uSBC. USBC 0 220 drives Stations 1, 2, 3, and 4, labelled 202, 204, 206, 208 respectively, with Data Destinate signal 308. USBC 1 222 drives Stations 5, 6, 7, 8, labelled 210, 212, 214, 216, respectively, with Data Destinate signal 310. The Data Destinate signal is activated by a uSBC when it is executing an instruction that stores data in a register within a Station. It indicates to the Station that the uSBC is going to send that Station some data over the Data path. Thus, the DST signal specifies a request to write data to a Station.

5. Latch Set Signals

Also shown on FIG. 6, is one Latch Set signal output from each uSBC. USBC 0 220 drives Stations 1, 2, 3, and 4, labelled 202, 204, 206, and 208 respectively, with Latch Set signal 312. USBC 1 222 drives Stations 5, 6, 7, and 8, labelled 210, 212, 214, and 216, respectively, with Latch Set signal 314. The Latch Set signal is generated by a uSBC when it executes a Set/Clear (STCL) instruction, which sets the state of a designator located on a Station.

6. Latch Clear Signals

There is one Latch Clear signal output from each uSBC. USBC 0 220 drives Stations 1, 2, 3, and 4, labelled 202, 204, 206, and 208, respectively, with Latch Clear signal 316. USBC 1 222 drives Stations 5, 6, 7, and 8, labelled 210, 212, 214, and 216, respectively, with Latch Clear signal 318. The Latch Clear signal is generated by a uSBC when it executes a Set/Clear (STCL) instruction, which clears the state of a designator located on a Station.

7. Branch On External Condition Signals

There is one Branch On External Condition signal output from each uSBC. USBC 0 220 drives Stations 1, 2, 3, and 4, labelled 202, 204, 206, and 208, respectively, with Branch On External Condition signal 320. USBC 1 222 drives Stations 5, 6, 7, and 8, labelled 210, 212, 214, and 216, respectively, with Branch On External Condition signal 322. The Branch On External Condition signal is generated by a uSBC when it executes a External Branch (BRCH) instruction, which tests the state of a designator located on a Station. The state of the designator tested is used to determine whether a branch is taken during the execution of the instruction stream.

8. Lock Bus Signals

Finally on FIG. 6, there is shown one Lock Bus signal output from each uSBC. USBC 0 220 drives Stations 1, 2, 3, and 4, labelled 202, 204, 206, and 208, respectively, with Lock Bus signal 324. USBC 1 222 drives Stations 5, 6, 7, and 8, labelled 210, 212, 214, and 216, respectively, with Lock Bus signal 326. The Lock Bus signal is generated by a uSBC to prevent any Station from accessing the Micro Bus 218. This signal is set during maintenance processing or when a uSBC detects a bus error.

III. The Microsequencer Bus Controller

The Microsequencer Bus Controller (uSBC) is a special purpose microprocessor that executes instructions to monitor and control the transfer of data within the Microsequencer Bus Controller System 200. Refer to FIG. 1. There are two uSBCs in the system to ensure that all data manipulations are verified with duplex checking. One is considered to be the master 220, and the other the slave 222. Only the master uSBC 220 drives the Data on the Micro Bus 218, but both master and slave uSBCs drive Address 236, 238, and Control 240, 242, signals to lower the loading on the Micro Bus 218. The slave uSBC 222 sends the results of each instruction to the master uSBC 220 on a separate Line 230. The master uSBC then compares this value to the result it computed. If the values are different, an internal check error condition has occurred. This is a fatal error that is reported to the MTCC 244. The uSBC processing is halted because of the error.

The uSBCs 220, 222, interface with the Micro Bus 218 over three separate sets of lines. Refer again to FIG. 1. The Address lines 236, 238, contain 11 bits. The Data lines 232, 234, contain 36 bits plus 2 parity bits if the Microsequencer Bus Controller System 200 is operating in 36-bit mode. The Data lines contain 32 bits plus 2 parity bits if the Microsequencer Bus Controller System is operating in 32-bit mode. The Control lines 240, 242, contain 11 bits. Notice that the uSBCs, although connected to the Micro Bus, are not considered to be Stations. Furthermore, the slave uSBC has its transmitters disabled, thus it can only receive data from the Micro Bus 218.

The uSBCs also interface with the MTCC 244 for initialization and maintenance functions, and clock circuitry to receive signals that control the sequential elements of the uSBC.

IV. Address and Control Lines Usage

When the uSBCs need to read data from a register on a Station, the following processing is performed. For example, consider the case where uSBC 0 220 is to read data from Station I 202. First, the uSBC responsible for addressing the selected Station (i.e., uSBC 0 220) begins to activate the Address lines 236. The Address 236 is set up to reference a particular register via the Register Buffer Index field 274 on Station 1 as detailed in FIG. 4. Next, if the Micro Bus 218 is available, uSBC 0 activates the BUS BUSY line 294, 296, 298, 300, 302, 304, 306 for all stations except the selected Station. The uSBC then activates the SRC signal 276 to direct Station 1 202 to read the data from the specified register and forward it back to uSBC 0 220 over the Data lines 232.

Figure 7:
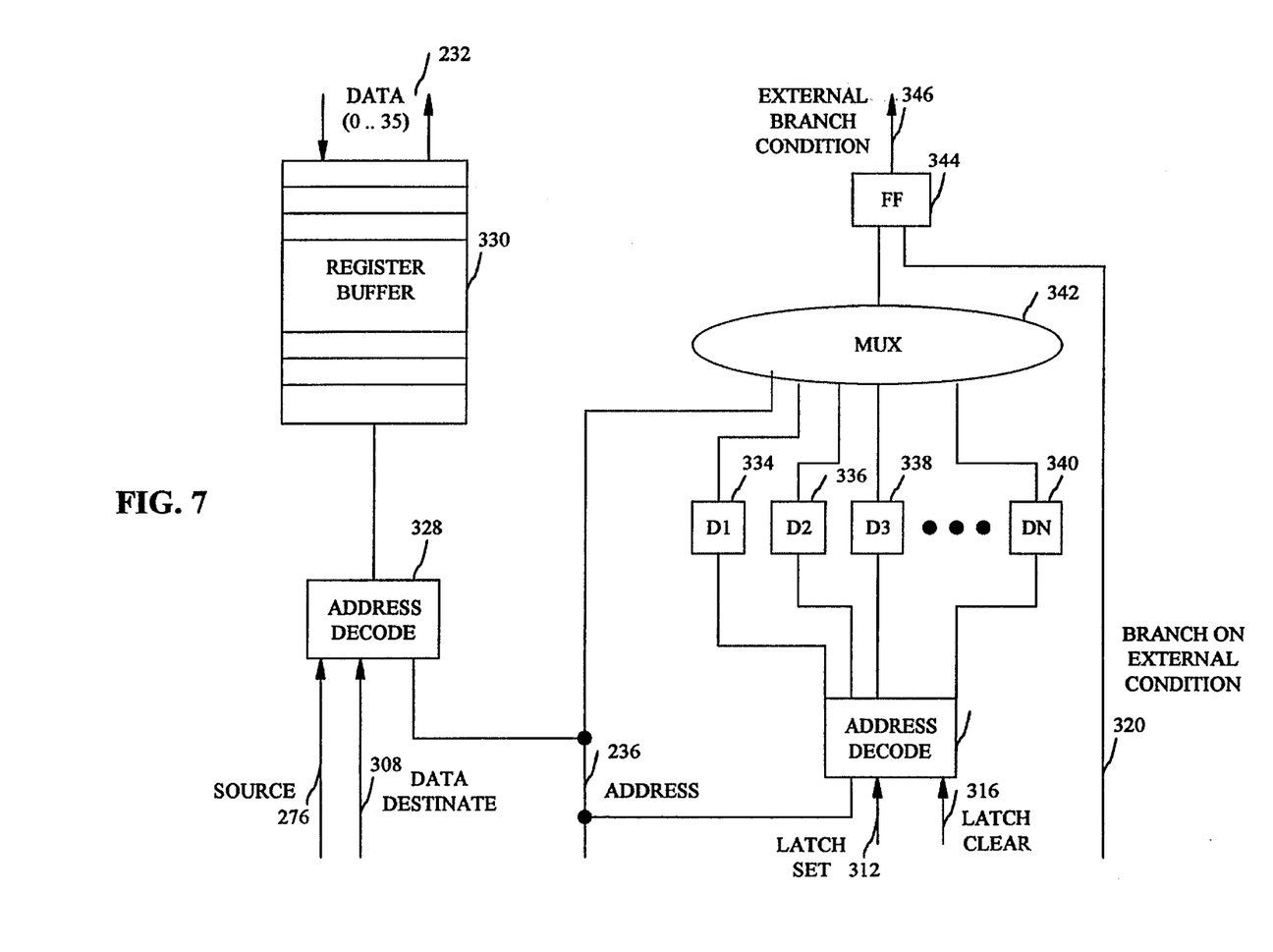
FIG. 7 is a block diagram illustrating the use by a Station of the Address and control signals.

FIG. 7 is a block diagram illustrating the use by a Station of the Address and control signals. Each of the Stations contain registers, designators, and logic as shown in FIG. 7. Continuing with the example above, Station 1 202, upon activation of the SRC signal 276, decodes the Address 236 in the Address Decode logic 328. The Address Decode logic 328 interprets the Register Buffer Index field 274 of the Address 236 as an index into Register Buffer 330. The contents of the selected register is then returned to uSBC 0 220 over Data lines 232. To complete processing of the example, uSBC 0 then activates the BUS BUSY signals to all Stations on the Micro Bus 218.

Writing data to a register on a Station is performed in a similar fashion. The uSBC first puts the Address of the register to be written on the Address lines 236. The uSBC then activates the BUS BUSY lines for all Stations except the selected Station. Next, the uSBC activates the DST signal 308 to notify the Station that it must write the specified register. The Station senses the DST signal 308 and uses Address Decode logic 328 to interpret the Address 236. The Address Decode logic 328 interprets the Address as an index into the Register Buffer 330. The Station looks for the data to arrive on Data lines 232 from the uSBC and writes this data into the selected register.

The process of setting and clearing designators is different from that of reading and writing registers. For these operations, no data is transferred across Data lines 232. To set the state of a designator, the uSBC activates the BUS BUSY signal as before. The uSBC then activates the Latch Set signal 312. Address Decode logic 332 on the selected Station interprets the Register Buffer Index field 274 of Address lines 236 to select one of the Designators D1, D2, D3 . . . DN, labelled 334, 336, 338, and 340, respectively. The selected Designator is set to the "On" or "1" state. To clear the state of a designator, processing is the same as just described, except the operation performed by the Address Decode logic is to clear the selected Designator by setting it to the "Off" or "0" state.

The testing of a Designator on a Station is implemented as follows. The uSBC activates the BUS BUSY signal as before. The uSBC activates the Branch On External Condition signal 320 to direct the Station to test and return the state of the Designator specified in the Register Buffer Index field 274 of the Address lines 236. A Multiplexer (MUX) 342 is used to read the Address lines 236 and select a corresponding Designator D1, D2, D3 . . . DN. The state of the selected Designator is fetched and then stored into Flip-Flop (FF) 344. Since the Branch On External Condition (BOXC) signal 320 was received, the Flip-Flop 344 outputs the state of the selected Designator as External Branch Condition signal 346, which is sensed by the uSBC as the return status from its request for the state information. One skilled in the art can see that the single set of Address lines shown are interpreted to select different storage locations depending on which of the control signals (SRC, DST, LATCH SET, LATCH CLEAR, or BOXC) is activated. This dual usage of the Address lines effectively doubles the address space of the Microsequencer Bus Controller system.

This unique use of Address lines and control signals specifying different operations to be performed by a Station provides an improved method of directly addressing more registers and designators, and therefore meets the objectives as outlined above.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A data processing system including a processor coupled to a bi-directional bus containing data lines, address lines, and a set of control signals including signals to request reading or writing of a register external to the processor, and setting, clearing, or testing of a flag external to the processor, comprising:

a gate array coupled to the bi-directional bus, said gate array comprising:

(a) a plurality of registers coupled to the bi-directional bus;

(b) a plurality of flags, each of said plurality of flags storing a boolean value;

(c) first address decoding means, coupled to the bi-directional bus, for receiving the control signal to request reading one of said plurality of registers, for receiving the control signal to request writing one of said plurality of registers, for receiving the address lines, and for decoding the address lines received to select one of said plurality of registers to be read from or written to;

(d) second address decoding means, coupled to the bi-directional bus, for receiving the control signal to request setting one of said plurality of flags, for receiving the control signal to request clearing one of said plurality of flags, for receiving the address lines, and for decoding the address lines received to select one of said plurality of flags to be set or cleared;

(e) selecting means, coupled to the bi-directional bus and said plurality of flags, for receiving the address lines and reading said boolean value of one of said plurality of flags specified by the address lines; and (f) a flip-flop, coupled to said selecting means and to the bi-directional bus, for receiving said boolean value of said selected one of said plurality of flags from said selecting means, receiving the control signal to request the testing of one of said plurality of flags, and for outputting to the processor the control signal representing said boolean value of said selected one of said plurality of flags.

2. A method for accessing registers and flags resident on a gate array by a processor connected to the gate array by a bi-directional bus, said bi-directional bus including control signals to read and write registers, and set, clear, and test flags, data lines, and address lines, comprising the steps of:

(a) activating address lines by the processor to reference a selected register or flag on a gate array, each of the flags storing a boolean value;

(b) activating a selected one of the control signals by the processor to direct the gate array to perform a function on a selected storage location on the gate array specified by said address lines;

(c) sensing said selected control signal by the gate array and decoding said address lines to select a register or a flag depending on which control signal is sensed;

(d) if said selected control signal indicates a read of a register, reading said selected register by the gate array and returning said selected register's contents to the processor over the data lines;

(e) if said selected control signal indicates a write of a register, writing said selected register by the gate array with data received over the data lines from the processor;

(f) if said selected control signal indicates a set of a flag, setting said selected flag by the gate array;

(g) if said selected control signal indicates a clear of a flag, clearing said selected flag by the gate array; and (h) if selected control signal indicates a test of a flag, testing selected flag by the gate array and returning said boolean value of the selected flag to the processor over a separate control signal.

3. A data processing system comprising:

a processor;

a bi-directional bus, coupled to said processor, said bi-directional bus including data lines, address lines, and a set of control signals, said control signals including signals for reading or writing of a register external to the processor, and for setting, clearing, or testing of a flag external to the processor;

a gate array coupled to the bi-directional bus, said gate array comprising:

a plurality of registers coupled to said bi-directional bus;

a plurality of flags, each of said plurality of flags storing a boolean value;

first address decoding means, coupled to the bi-directional bus, for receiving the control signal to request reading one of said plurality of registers, for receiving the control signal to request writing one of said plurality of registers, for receiving the address lines, and for decoding the address lines received to select one of said plurality of registers to be read from or written to;

second address decoding means, coupled to the bi-directional bus, for receiving the control signal to request setting one of said plurality of flags, for receiving the control signal to request clearing one of said plurality of flags, for receiving the address lines, and for decoding the address lines received to select one of said plurality of flags to be set or cleared;

selecting means, coupled to the bi-directional bus and said plurality of flags, for receiving the address lines and reading said boolean value of one of said plurality of flags specified by the address lines; and means coupled to said selecting means and to the bi-directional bus for receiving said boolean value of said selected one of said plurality of flags from said selecting means, receiving the control signal to request the testing of one of said plurality of flags, and for outputting to the processor the control signal representing said boolean value of said selected one of said plurality of flags.

* * * * *